United States Patent [19]

Richiardi

[11] 4,263,538
[45] Apr. 21, 1981

[54] CONTROL SYSTEM FOR AN AUTOMATIC MACHINE

[75] Inventor: Claudio Richiardi, Turin, Italy

[73] Assignee: Societá di Elettronica per l'Automazione Sepa S.p.A., Turin, Italy

[21] Appl. No.: 898,566

[22] Filed: Apr. 21, 1978

[51] Int. Cl.³ .............................................. G05B 19/42
[52] U.S. Cl. .................................... 318/568; 318/573; 318/607
[58] Field of Search ......................... 318/568, 573, 607

[56] References Cited

U.S. PATENT DOCUMENTS

| 3,943,343 | 3/1976 | Irie | 318/573 X |
| 4,132,938 | 1/1979 | Sano et al. | 318/568 |
| 4,163,183 | 7/1979 | Engelberger et al. | 318/568 |

*Primary Examiner*—B. Dobeck
*Attorney, Agent, or Firm*—Sughrue, Rothwell, Mion, Zinn & Macpeak

[57] ABSTRACT

A control system for an automatic machine or robot having an articulated arm, comprising position transducers for sensing the position of the arm, actuators for effecting displacement of the arm and a mini-processor which receives signals from the transducers and feeds signals to the actuators, the mini-processor including a memory in which are stored digital data representing the movement of the arm, the stored data being memorized by the mini-processor at a selected frequency depending on the movement of the arm in a learning mode of operation of the machine, this selection being effected cyclically by sampling the transducer signal at a plurality of different frequencies and then calculating for each sequence of signals sampled at a frequency lower than a maximum frequency the values of the signals at points, interpolated between the sampled points, which would have been sampled at the maximum frequency: the calculated values are then compared with the actual sampled values at the maximum frequency and the lowest sampling frequency at which the error between the calculated values and the sampled values is below a certain threshold is used as the recording frequency for that cycle; when the memorized data is used the processor again interpolates between the recorded points but this time at a frequency much higher than the recording maximum, to generate control signals to be fed to the actuators.

5 Claims, 9 Drawing Figures

CONTROL SYSTEM FOR AN AUTOMATIC MACHINE

The present invention relates to a control system for an automatic machine and particularly to a control system adapted for controlling a machine of the type conventionally referred to as a "robot" and comprising an articulated mechanical arm, movable with various degrees of freedom so that its free end may describe any type of spatial path within the limits of its displacement, the arm having associated position transducer means sensitive to the position of the arm and operable to produce output signals representative of the position of the arm. A control system for such a robot is described in detail in Italian Patent Application No. 70716-A/74 filed the Dec. 20, 1974 in the name of Fiat Societa per Azioni. This control system includes position transducer means sensitive to the position of the arm and responsive to displacements thereof to produce output signals representative of the position of the arm, a mini-processor connected to receive signals from the transducer means in a first or learning mode of operation of the machine, in which an operator displaces the arm along a selected path, to process the signals generated by the transducer means to produce sequential digital data signals representative of the spatial coordinates of a plurality of spaced points along the path of movement impressed on the arm by the operator, memory means operable to store the sequential digital data signals, and actuator means operable in response to signals generated by the memory means in a second or reproduction mode of operation of the machine, to displace the arm along a path which at least approximately reproduces the movement impressed on the arm by the operator in the learning mode.

In this known system described in the above mentioned patent application, the signals produced by the transducer or transducers during the first operating phase of the machine, that is, in the "learning" or recording mode during which an operator displaces the arm over a required path, after having been processed to transform them into a sequence of digital data signals representing all the points forming the path followed by the arm, were stored in a magnetic tape memory.

The memorised sequential digital data signals were then processed by the mini-processor to generate therefrom a second series of sequential digital data signals, representative of the spatial coordinates of the significant points of a path which approximated the path over which the arm was displaced by the operator during the learning phase. This second series of sequential digital data was stored in the central memory of the mini-processor so that it could be used to originate the working signals for the actuator means which controlled the movement of the arm in order to reproduce an approximation of the original movement.

The present invention seeks to provide a system for the control of an automatic robot machine of the above described type which enables elimination of the intermediate processing phase of the data stored in the auxiliary mass memory (magnetic tape recorder) used in the system described in the patent application mentioned above, by performing this processing at the same time as the initial recording thus simplifying the apparatus by the elimination of the auxiliary mass memory.

The invention also seeks to produce a system in which the reproduced movement of the arm more closely and accurately reproduces the original path than was previously possible with the known system described above.

According to the present invention, therefore, there is provided a control system for the control of an automatic machine or robot of the type comprising an articulated mechanical arm, movable with a plurality of degrees of freedom by which its free end may describe any spatial path within its range of movement, the control system comprising position transducer means sensitive to the position of the arm and responsive to displacements thereof to produce output signals representative of the position of the arm, a mini-processor connected to receive signals from the transducer means in a first or learning mode of operation of the machine, in which an operator displaces the arm along a selected path, to process the signals generated by the transducer means to produce sequential digital data signals representative of the spatial coordinates of a plurality of spaced points along the path of movement impressed on the arm by the operator, memory means operable to store the sequential digital data signals, and actuator means operable in response to signals generated by the memory means in a second or reproduction mode of operation of the machine, to displace the arm along a path which at least approximately reproduces the movement impressed on the drum by the operator in the learning mode, characterised in that the memory means are constituted solely by a static magnetic core memory forming part of the mini-processor, in that the mini-processor is adapted to operate in the first or learning mode, in such a way as to determine automatically and continuously, for each of the degrees of freedom, the minimum acceptable recording frequency from a plurality of possible frequencies, by sampling the transducer signals at a predetermined maximum frequency and at the said plurality of possible frequencies and calculating, on the basis of the Lagrange four point interpolation formula, interpolated values of the signals between the points actually sampled at each frequency below the maximum at points corresponding to sampling at the maximum frequency, comparing the calculated values at each frequency with the actual values of the corresponding points sampled at the maximum frequency, and by selecting on the basis of such comparison the minimum sampling frequency at which the calculated values of the signals at the intermediate points differ from the actual sampled values of the signals at the corresponding points sampled at the maximum frequency by less than a predetermined maximum error value, in that sequential digital data derived from the sampling at the said selected minimum sampling frequency are directly stored in the aforesaid static memory, and in that the digital data stored in the static memory for each of the degrees of freedom are processed by the mini-processor to make them suitable for the said actuator means by generating, again on the basis of the four point Lagrange interpolation formula, supplementary digital signals representing calculated values of the transducer signals at points which would have been sampled and stored by carrying out the sampling at a frequency many times higher than the maximum frequency used in the learning mode of the machine.

One embodiment of the present invention will now be more particularly described, by way of non-limiting example, with reference to the accompanying drawings, in which.

Figure 1:
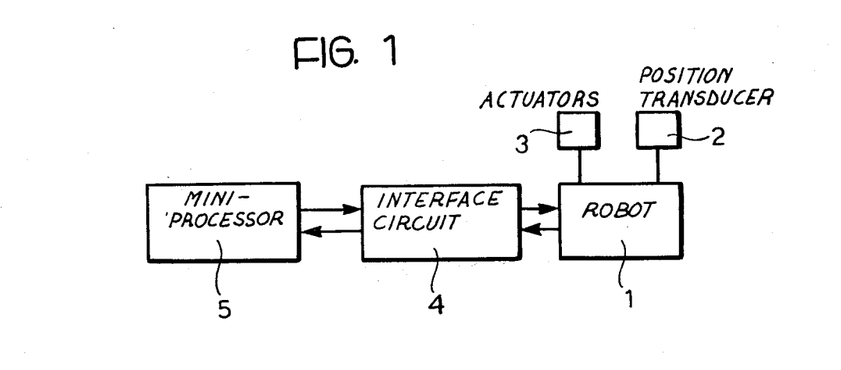
FIG. 1 is a block diagram illustrating the system of the present invention.

Referring now to the drawings there is shown in FIG. 1 a robot 1 provided with an articulated mechanical arm having several degrees of freedom allowing its free end to describe any spatial path within the limits of its maximum range of movement.

The position of the arm of the robot is sensed by position transducer means 2 and controlled by actuator means 3. The robot 1 is connected, by means of an interfacing circuit 4 to a mini-processor 5.

The mini-processor 5 may be, for example, a device sold as ULP 12 by SEPA S.p.A., having a magnetic core central memory.

In the learning or recording phase the mini-processor 5 automatically and continuously determines the best sampling frequency in relation to the acceleration of the arm in order to obtain a predetermined quality of reproduction for the path being learnt.

In this embodiment the mini-processor operates to sample the transducer output signals at the following frequencies: 1 Hz; 2 Hz; 5 Hz; 10 Hz.

Figure 5:
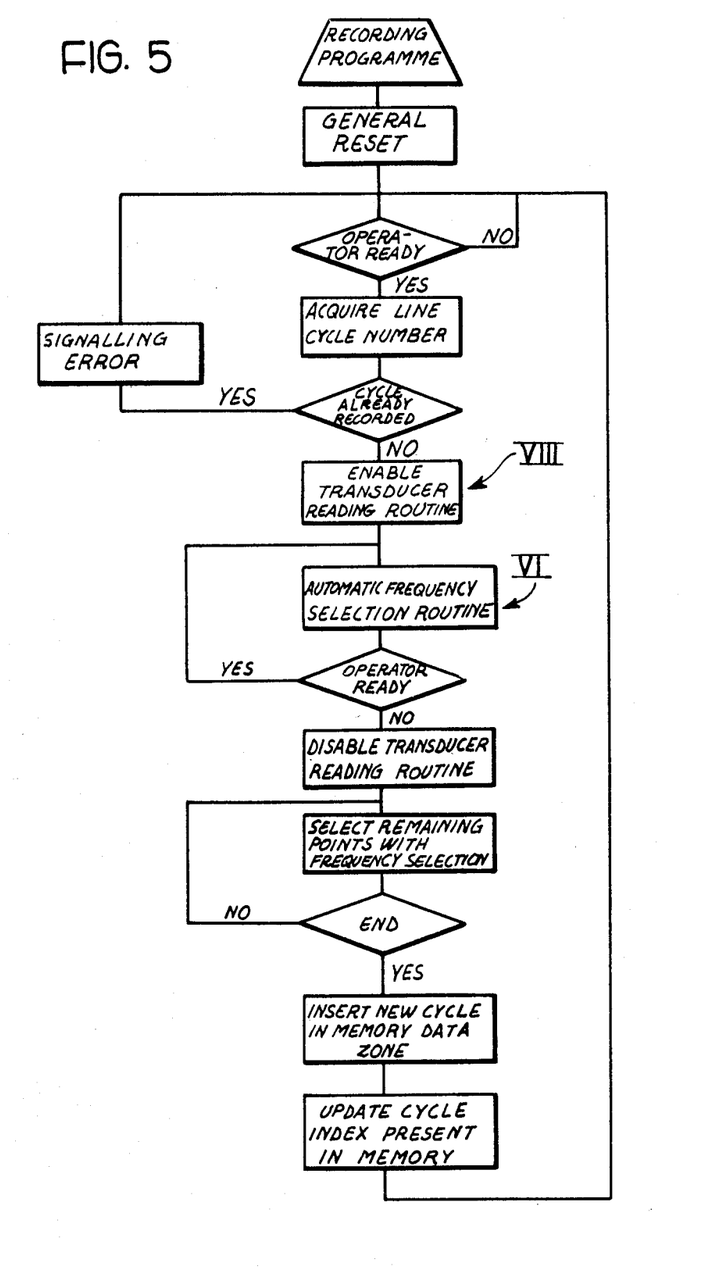
FIG. 5 is a flow chart illustrating the mini-processor recording programme.
Figure 6:
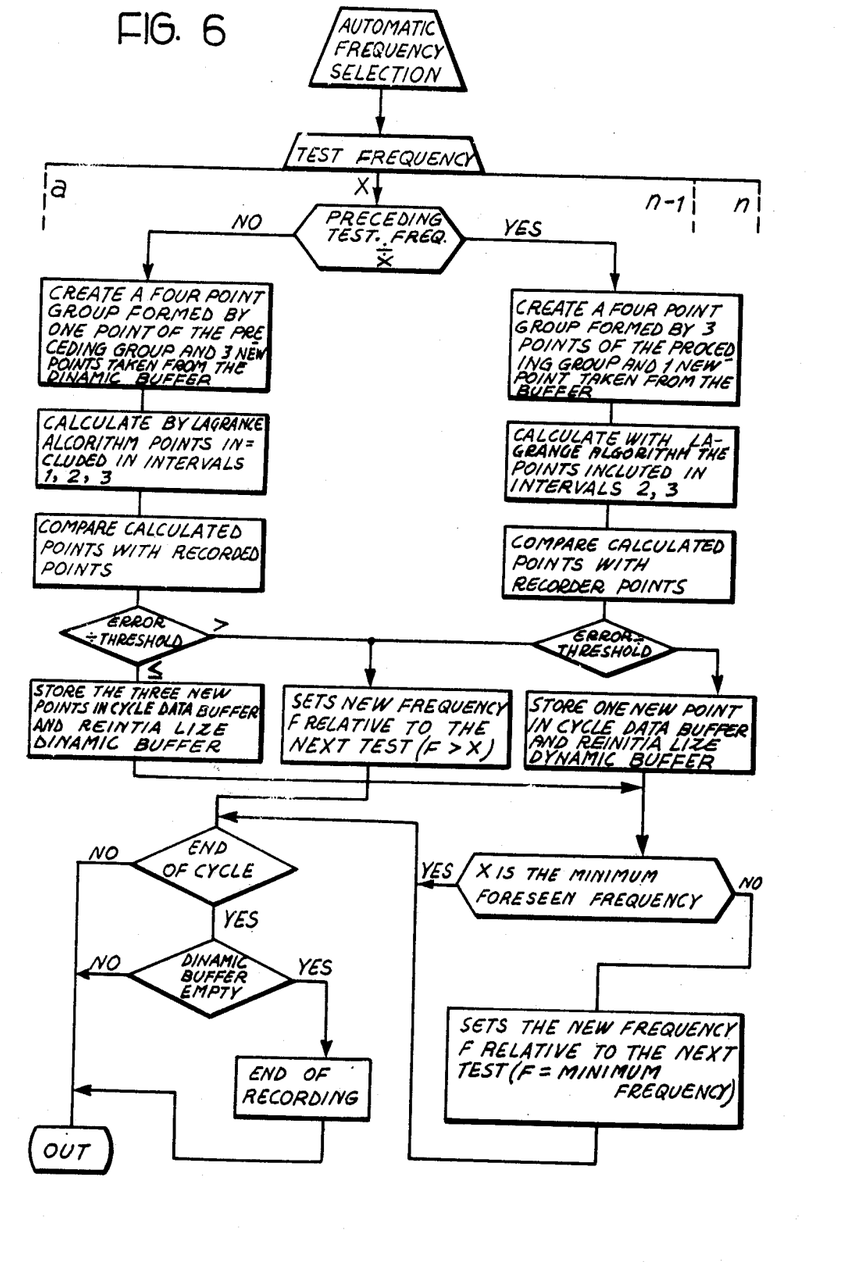
FIG. 6 is a flow chart illustrating the automatic selection of the recording frequency of the points of the path, representing in more detail the block shown by arrow VI in FIG. 5.
Figure 7:
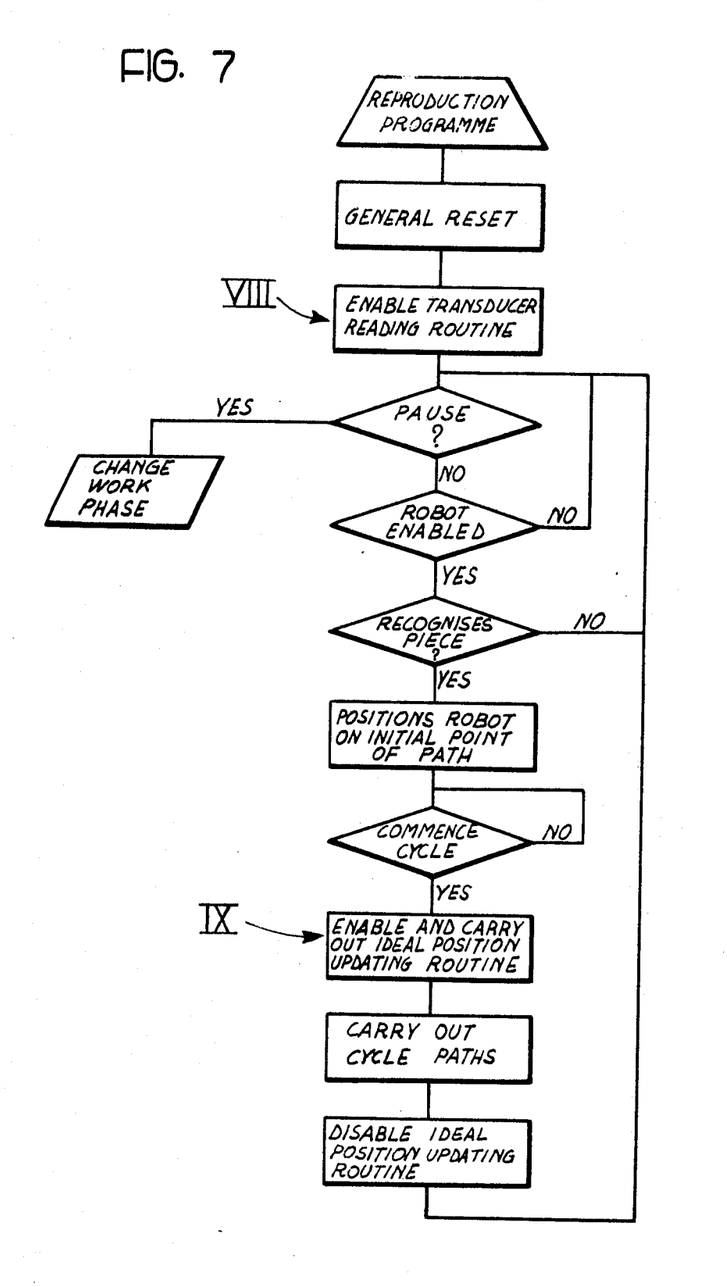
FIG. 7 is a flow chart illustrating the reproduction programme.
Figure 8:
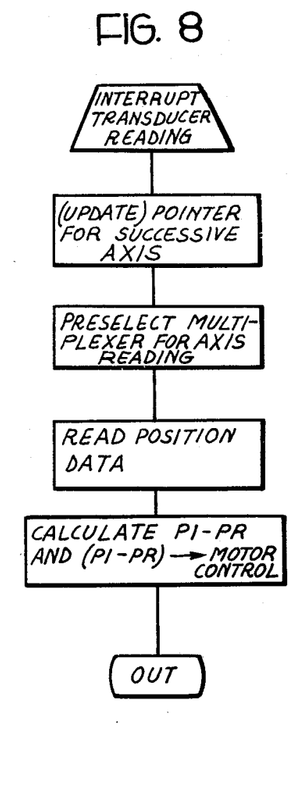
FIG. 8 is a development of the block indicated by arrow VIII in FIGS. 5 and 7 illustrating the routine for the reading of the transducer.
Figure 9:
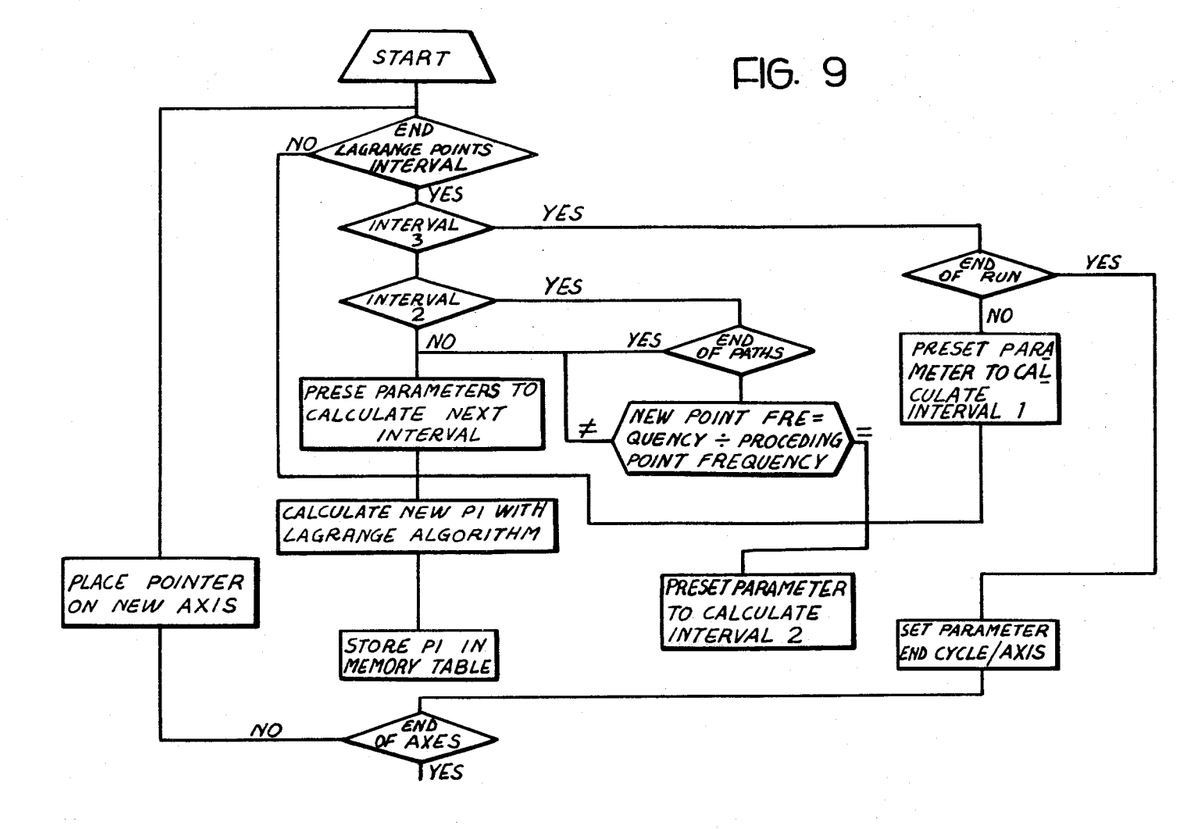
FIG. 9 is a flow chart illustrating the regeneration of the path during the reproduction programme, representing in more detail the block shown by arrow IX in FIG. 7.

The selection of the recording frequency is made with reference to certain selection criteria; in fact, as illustrated in detail in the flow charts of FIGS. 5 and 6, the mini-processor calculates, on the basis of the four point Lagrange interpolation formula, from all the points sampled at the frequencies of 1, 2 and 5 Hz, the value of those points which are missed by sampling at these frequencies but which would have been sampled at a sampling frequency of 10 Hz. The mini-processor then compares the value of these calculated points with the data of the corresponding points actually sampled at a frequency of 10 Hz, and on the basis of such comparison selects the minimum sampling frequency at which the data of the intermediate points, calculated in the above specified manner, differs from the data of the corresponding points actually sampled at a frequency of 10 Hz by less than a predetermined maximum error value.

The four point Lagrange interpolation formula is well known in the literature. See for example M. Abramowitz and I.A. Stegun, Handbook of Mathematical Functions with Formulas, Graphs and Mathematical Tables, National Bureau of Standards Applied Mathematics Series No. 55, Washington 1964, pp. 878, 879, 901, 902, 903.

In the reproduction mode the processor, simultaneously and independently for each degree of freedom, reproduces the required work cycle path (learnt in the recording phase) by generating, on the basis of the aforesaid four point Lagrange interpolation formula, all the missing points between those recorded, at a frequency equivalent to a sampling frequency of 50 Hz, that is to say many times higher than the maximum sampling frequency used in the learning or recording mode.

For example, if the acquisition frequency of the data relating to one degree of freedom during learning was 1 Hz, the calculator generates forty-nine intermediate points between each recorded point; if on the other hand the acquisition frequency was 2 Hz, then twenty-four intermediate points are generated between each point, and likewise if it was 5 Hz then nine intermediate points are generated, whilst if it was 10 Hz then four intermediate points are generated between each recorded point.

The use of the Lagrange interpolation formula, allows values to be generated for points between those recorded with a minimum of deviation from actual values of those points.

The accuracy of the regeneration of such points is, for any degree of freedom, related directly to the frequency of the sampling used in the recording phase at a given speed of movement of the arm along the axis considered; that is the greater the recording frequency the greater the accuracy.

Figure 2:
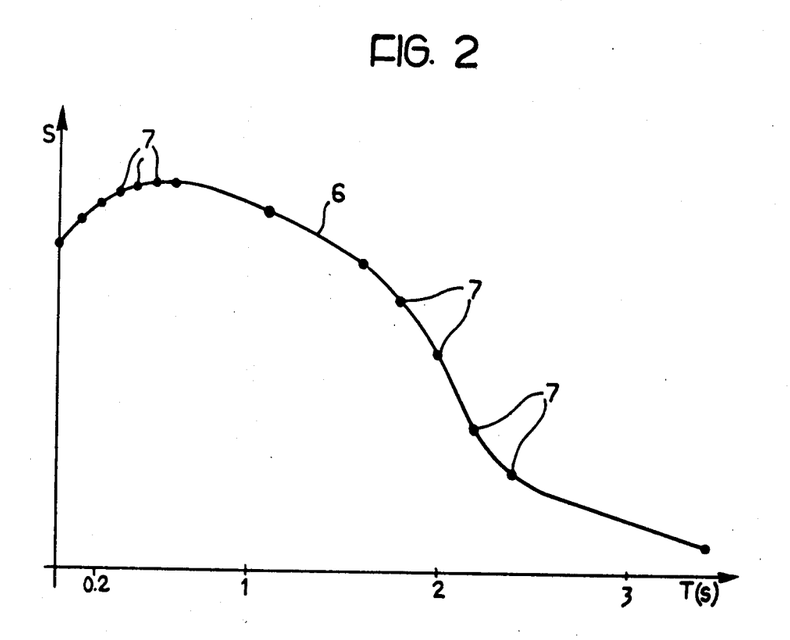
FIG. 2 is a graph showing an example of the points acquired and stored in a recording phase.
Figure 3:
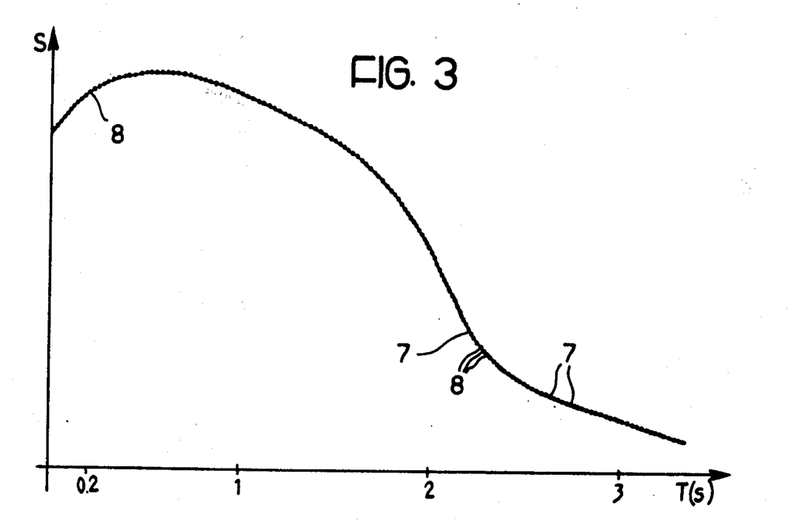
FIG. 3 is a graph illustrating the points regenerated in the reproduction phase.
Figure 4:
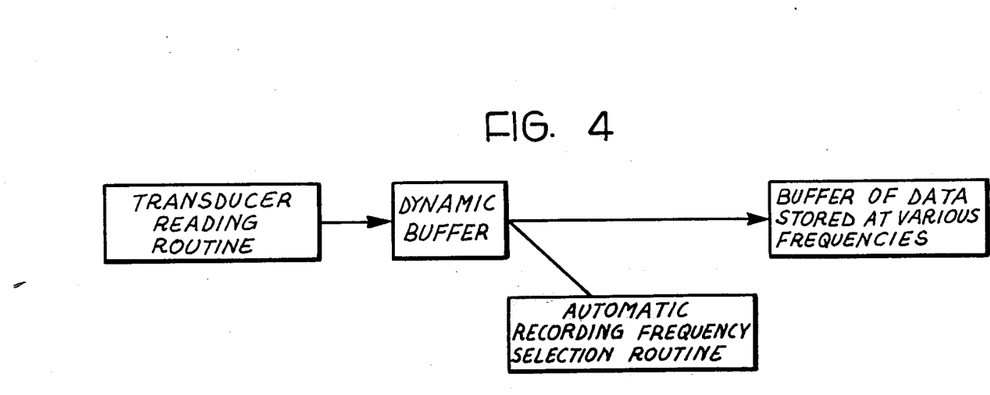
FIG. 4 is a schematic diagram illustrating the way the data is treated during the recording phase.

Comparing FIGS. 2 and 3, which both refer to the same movement, it is noted that the selection of the sampling frequency which gives rise to the recording of data representing the points 7 takes place in such a way as to be directly proportional to the acceleration, or rate of change, of the movement to be learnt. In FIG. 3, the points 8 regenerated in the reproduction phase are substantially equally spaced and the interpolation between the recorded points produces a path which represents the original with a minimum of error.

What is claimed is:

1. A control system for the control of an automatic or robot having an articulated mechanical arm movable with a plurality of degrees of freedom by which its free end may describe any spatial path within its range of movement, said control system comprising:

position transducer sensitive to the position of said arm and responsive to displacements thereof to produce output signals representative of the position of said arm, a mini-processor connected to the output of said transducer means whereby, in a learning mode of operation of the machine in which an operator displaces the arm along a selected path, said mini-processor is operable to process the signals generated by said transducer means to produce sequential digital data signals representative of the spatial coordinates of a plurality of spaced points along the path of movement impressed on said arm by the operator, memory means connected to said mini-processor and operable to store the sequential digital data signals produced thereby, and actuator means operatively connected to said arm and electrically connected to said mini-processor and operating in response to signals generated by said memory means in a reproduction mode of operation of the machine, to displace said arm along a path which at least approximately reproduces the movement impressed on said arm by the operator in said learning mode, wherein said memory means are constituted solely be a static magnetic core memory forming part of said mini-processor, said mini-processor is adapted to operate in said learning mode to sample said transducer signals at a predetermined maximum frequency and also at a predetermined plurality of possible frequencies less than the said maximum frequency, to calculate interpolated values at points between the points actually sampled at each frequency below the maximum and corresponding to points at which sampling at said maximum frequency occurs, to compare said calculated values at each frequency with the actual values of the corresponding points sampled at said maximum frequency, and to select on the basis of such comparison the minimum sampling frequency at which said calculated values of the signals at said intermediate points differ from the actual sampled values of the signals at said corresponding points sampled at said maximum frequency by less than a predetermined maximum error value, said sequential digital data derived from sampling at said selected minimum sampling frequency are directly stored in said static memory, and said digital data stored in said static memory for each of the degrees of freedom are processed by said mini-processor to make them suitable for said actuator means by generating supplementary digital signals representing calculated values of said transducer signals at points which would have been sampled and stored by carrying out said sampling at a frequency many times higher than said maximum frequency used in the learning mode of said machine.

2. The control system of claim 1, wherein said plurality of frequencies used in said learning mode of said machine lie between 1 and 10 Hz inclusive.

3. The control system of claim 1, wherein said frequency used in the reproduction phase to generate said supplementary digital data is 50 Hz.

4. A process for controlling the movement of a mechanical robot arm comprising:

manually moving the arm along a desired path and producing output signals representative of the position of the arm during the manual movement;

sampling the output signals at a maximum frequency and at a plurality of lower frequencies;

individually interpolating the sampled output signals based on the samples generated for each of the lower frequencies to produce a plurality of interpolated signals;

comparing the output signal sampled at the maximum frequency with corresponding points on each of the interpolated signals;

selecting the lowest sampling frequency having interpolated signals which differ from the output signal sampled at the maximum frequency by less than a predetermined maximum error value;

storing in a static memory the values of the output signals sampled at the selected frequency; and controlling the movement of the arm by interpolating the values of the output signals stored in the static memory to provide position signals to the arm at a frequency higher than the selected frequency.

5. The process of claim 4 wherein the steps of interpolating the sampled output signals and the values of the output signals stored in the static memory are performed in accordance with the four point Lagrange interpolation formula.

* * * * *

UNITED STATES PATENT AND TRADEMARK OFFICE
CERTIFICATE OF CORRECTION

PATENT NO. : 4,263,538
DATED : April 21, 1981
INVENTOR(S) : Claudio RICHIARDI

It is certified that error appears in the above—identified patent and that said Letters Patent is hereby corrected as shown below:

Please add the following to page 1 of the printed patent:

--Foreign Application Priority Data

May 30, 1977      Italy........................68226-A/77--

Signed and Sealed this

Twenty-fifth Day of August 1981

[SEAL]

Attest:

GERALD J. MOSSINGHOFF

Attesting Officer      Commissioner of Patents and Trademarks